(12) United States Patent
Stadelmeier et al.

(10) Patent No.: US 8,462,866 B2
(45) Date of Patent: *Jun. 11, 2013

(54) TRANSMITTING APPARATUS AND METHOD, AND RECEIVING APPARATUS AND METHOD

(75) Inventors: Lothar Stadelmeier, Stuttgart (DE); Dietmar Schill, Winnenden (DE); Daniel Schneider, Stuttgart (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,574

(22) Filed: Mar. 1, 2012

(65) Prior Publication Data

US 2012/0183022 A1 Jul. 19, 2012

Related U.S. Application Data

(63) Continuation of application No. 12/327,402, filed on Dec. 3, 2008.

(30) Foreign Application Priority Data

Dec. 11, 2007 (EP) .................................... 07254763
Nov. 18, 2008 (EP) .................................... 08253749

(51) Int. Cl.
*H04K 1/10* (2006.01)
(52) U.S. Cl.
USPC ........... 375/260; 375/259; 375/316; 375/295; 370/203; 370/204; 370/205; 370/206; 370/207
(58) Field of Classification Search
USPC .................. 375/260, 259, 316, 295; 370/203, 370/204, 205, 206, 207, 208, 209, 210
See application file for complete search history.

(56) References Cited

U.S. PATENT DOCUMENTS

2003/0144033 A1 7/2003 Sumasu et al.
2006/0153312 A1* 7/2006 Yun et al. ..................... 375/267

FOREIGN PATENT DOCUMENTS

| EP | 1 643 658 A1 | 4/2006 |
| EP | 1 617 569 B1 | 9/2007 |
| JP | 2008-259231 | 10/2008 |
| RU | 2 145 152 C1 | 1/2000 |

OTHER PUBLICATIONS

Berna Özbek, et al., "On Space-Frequency Block Codes for Unequal Channels", 2nd COS Broadband Wireless Local Access, May 21-22, 2003 pp. 1-6.

Office Action issued Jun. 10, 2011, in European Patent Application No. 10 164 886.3.

Extended European Search Report issued Aug. 24, 2010 in EP 10 16 4886.

(Continued)

*Primary Examiner* — Zewdu Kassa
(74) *Attorney, Agent, or Firm* — Oblon, Spivak, McClelland, Maier & Neustadt, L.L.P.

(57) ABSTRACT

A method of transmitting data symbols via an Orthogonal Frequency Division Multiplexed (OFDM) symbols that includes forming data symbols into pairs and generating a first pair of modulation symbols for each of the pairs of data symbols, where the first pair of modulation symbols form first and second modulation symbols of an Alamouti cell. The method further includes forming a first version of the OFDM symbols by modulating the sub-carriers allocated for carrying the data with the first and second modulation symbols of the Alamouti cells, and modulating the one or more pilot carriers of the first version of the OFDM symbol according to a predetermined pattern.

16 Claims, 9 Drawing Sheets

OTHER PUBLICATIONS

Arogyaswami Paulraj et al., "Introduction to Space-Time Wireless Communications", Cambridge University Press, May 1, 2003, XP 002538892, pp. 182-189.

Oliver Haffenden, " Pilot patterns for MISO/MIMO", BBC Research, Nov. 29, 2007, 6 Pages.

Jaekwon Kim et al, "A Decision Directed Receiver for Alamouti Coded OFDM Systems", IEEE Vehicular Technology Conference, vol. 1, Oct. 6, 2003, pp. 662-665.

Notice of Acceptance issued Apr. 18, 2012 in Australian Application No. 2008255145.

European Office Action mailed Apr. 2, 2013, in European Patent Application No. 11177512.8-1860/2387173.

Arogyaswami Paulraj et al., "Introduction to Space-Time Wireless Communications", Cambridge University Press, May 1, 2003, XP 002538892, pp. 1-11.

* cited by examiner

TRANSMITTING APPARATUS AND METHOD, AND RECEIVING APPARATUS AND METHOD

CROSS-REFERENCE TO RELATED APPLICATIONS

The present application is a continuation of application Ser. No. 12/327,402, filed on Dec. 3, 2008, pending, which claims the benefit of priority from the prior European Patent Application Nos. 07254763.1, filed on Dec. 11, 2007, and 08253749.9, filed on Nov. 18, 2008. The entire contents of each of the above applications are incorporated herein by reference.

FIELD OF INVENTION

The present invention relates to transmitters for and methods of transmitting data via Orthogonal Frequency Division Multiplexed (OFDM) symbols, the OFDM symbols comprising a plurality of data bearing sub-carriers and one or more pilot carriers. The present inventions also relates to receivers and methods for receiving data from an OFDM symbol.

BACKGROUND OF THE INVENTION

The Digital Video Broadcasting-Terrestrial standard (DVB-T) utilises Orthogonal Frequency Division Multiplexing (OFDM) to communicate data representing video images and sound to receivers via a broadcast radio communications signal. There are known to be two modes for the DVB-T standard which are known as the 2k and the 8k mode. The 2k mode provides 2048 sub-carriers whereas the 8k mode provides 8192 sub-carriers. Similarly for the Digital Video Broadcasting-Handheld standard (DVB-H) a 4k mode has been provided, in which the number of data carriers is three thousand and twenty four.

In accordance with a further development of the Digital Video Broadcasting-Terrestrial broadcasting standard, known as DVB-T2, there has been proposed that further modes for communicating data be provided in order to increase a data rate that can be provided by a digital broadcast system. This is for example to allow the DVB-T2 standard to be used to carry High Definition television signals.

In order to improve the integrity of communicated data, it has been proposed to utilise a space-frequency block coding technique known as Alamouti encoding, which requires that data symbols be paired, encoded and transmitted as pairs of modulation symbols. As such, in combination with an OFDM modulation system a Multiple-In-Multiple-Out (MIMO) or Multiple-In Single-Out (MISO) communications system can be formed.

European patent EP1617569 discloses a MIMO communications system, which utilises OFDM.

SUMMARY OF INVENTION

According to an aspect of the present invention there is provided a method of transmitting data symbols via Orthogonal Frequency Division Multiplexed (OFDM) symbols, the OFDM symbols comprising a plurality of data bearing sub-carriers and one or more continuous pilot sub-carrier symbols, which are located in the same position for each of the OFDM symbols and scattered pilot sub-carrier symbols, which change position between one OFDM symbol and another, in accordance with a predetermined pattern. The method comprises receiving the data symbols for communicating via the OFDM symbols, forming the data symbols into pairs, generating a first pair of modulation symbols for each of the pairs of data symbols, the first pair of modulation symbols forming first and second modulation symbols of an Alamouti cell, forming a first version of the OFDM symbol by modulating the sub-carriers allocated for carrying the data with the first and second modulation symbols of the Alamouti cells, and modulating the one or more pilot carriers of the first version of the OFDM symbol. The method also comprises generating a second pair of modulation symbols for each of the pairs of data symbols, the second pair of modulation symbols forming third and fourth modulation symbols of the Alamouti cell formed for the pair of data symbols in the first version of the OFDM symbols, forming a second version of the OFDM symbols by modulating the sub-carriers allocated for carrying the data with the third and fourth modulation symbols of the Alamouti cell, modulating the one or more pilot carriers of the second version of the OFDM symbol, and transmitting the first version of the OFDM symbol via a first antenna, and the second version of the OFDM symbols via a second antenna. The first and second versions OFDM symbols are formed with the continuous pilot symbol sub-carriers and the scattered pilot symbol sub-carriers in accordance with the predetermined pattern without pre-condition on the location of the pilot sub-carrier symbols with respect to a location of the data bearing sub-carrier symbols, such that for at least one of the pairs of data symbols, the sub-carriers, on which each of the first and second modulation symbols and the third and fourth modulation symbols forming the Alamouti cell, are separated within the first and second versions of the OFDM symbol by at least one other data bearing sub-carrier or one or more of the continuous and scattered pilot symbol sub-carriers.

Alamouti encoding is used in OFDM systems as a simple but efficient way to enable a MIMO (Multiple In Multiple Out) or MISO (Multiple In Single out) communications system. Alamouti encoding encodes pair-wise incoming data symbols, to form two pairs of modulation symbols, first and second modulation symbols and third and fourth modulation symbols of an Alamouti cell. Classical decoding of Alamouti cells requires that the pair wise encoded symbols are neighbored in time (space-time Alamouti) or frequency (space-frequency), i.e. neighbored sub-carriers need to have the same channel coefficient. This precondition can cause problems in pilot carrier locations and can result in a floor in the bit error rate/signal-to-noise ratio relationship, because an increase in the signal to noise ratio will not improve the bit error rate above a certain signal-to-noise value. The floor in the bit error rate is caused by the channel of neighbored carriers not being in reality the same.

An alternative decoding scheme that overcomes the bit error floors of classical Alamouti decoding has been disclosed in a presentation entitled "Alamouti in Varying Channels," by Oliver Haffenden from BBC Research and published on 5 Oct. 2007 on the DVB standard server. This disclosure from Haffenden proposes a Zero Forcing technique to decode the Alamouti cells. However, according to a later disclosure, which is provided in a presentation by Oliver Haffenden entitled "Pilot Patterns for MISO/MIMO", published on the DVB Server on 29 Nov. 2007, the grouping of the pairs of sub-carriers on which pairs of data symbols of Alamouti cells are transmitted within OFDM symbols, can restrict the location of the pilot sub-carrier symbols because of the requirement to transmit the data symbols of the Alamouti cell on pairs of neighboring or adjacent sub-carriers of the OFDM symbol, although this pairing of sub-carriers cannot always be achieved causing some Alamouti pairs of cells to be split by pilot symbol sub-carriers. This proposal therefore causes a restriction on the pattern of the pilot symbol sub-carriers, and indeed this proposal includes a requirement to transmit pairs continuous pilot symbols on pairs of adjacent sub-carriers. Embodiments of the present invention utilise the alternative Haffended decoding scheme to provide a generalized technique for decoding that allows the transmission of modulation symbols which form Alamouti cells (pair wise encoded input symbols) so that the modulation symbols of the Alamouti cells do not have to be transmitted in neighboring sub-carriers (space-frequency) or consecutive OFDM symbols (space-time). The advantages are twofold:

Alamouti encoding and pilot location can be independent. Pilot spacing can be designed without taking care of Alamouti cells (and vice versa). Thus the patterns of the pilot symbol sub-carriers can be designed to provide an accurate estimate of the communications channel independently and without influence from the position of the data bearing sub-carriers within the OFDM symbols. Therefore contrary to the proposal in the abovementioned presentation entitled "Pilot Patterns for MISO/MIMO" by Oliver Haffenden of 29 Nov. 2007, which requires that the pilot carriers are paired, the pilots carriers can be located independently.

The two modulation symbols of an Alamouti cell can be spread over a frequency and/or time area (interleaving of Alamouti cell building blocks). The performance improvement due to the additional diversity dimension can be significant.

In some examples, the number of data bearing sub-carriers per OFDM symbol is even, so that the sub-carriers can be paired for transmitting the pairs of data symbols of the Alamouti cells. Furthermore, the modulator can be arranged in operation to position the data bearing sub-carrier symbols throughout each of the OFDM symbols with the effect that as far as possible the first and second modulation symbols and the third and fourth modulation symbols forming each of the Alamouti cells are located on adjacent pairs of sub-carriers. As such, if the Alamouti cells are transmitted on pairs of adjacent sub-carriers, then for these Alamouti cells, a simplified decoding technique according to the classical Alamouti decoding can be used, which assumes that a coefficient of the channel frequency response is the same for both data symbols of the Alamouti cell. For Alamouti cells which are not transmitted on adjacent pairs of sub-carriers, a more complicated technique can be used such as Zero Forcing, which assumes that a coefficient of the channel frequency response for each data symbol of the Alamouti cells is different. However, it has been discovered that when the OFDM symbols are received in environments with significant multi-path, the use of the classical Alamouti decoding, can cause substantial degradation in the performance, even when the pairs of data symbols of the cells are transmitted on adjacent sub-carriers. Therefore, in some examples an apparatus for receiving the OFDM symbols, which have been transmitted by a transmitting apparatus identified above, a data detector may be arranged to detect the pair of data symbols of the Alamouti cells carried by the sub-carriers using, for example a zero forcing or minimum mean square error technique, which uses a different estimate of a coefficient of the channel frequency response to recover an estimate of the pairs of the data symbols from the Alamouti cells for each of the data bearing sub-carriers within each of the first and second versions of the OFDM symbol regardless of the position of the data bearing sub-carriers.

As a result of a freedom to distribute the pilot symbol sub-carriers within the OFDM symbols independently of the location of the data symbols, which can be provided by embodiments of the invention, a pattern of pilot symbol sub-carriers, which may be continuous or scattered which is used for a Single Input Single Output OFDM scheme such as that used for DVB, can also be used for a Multiple Input Single Output OFDM scheme such as that used for DVB-T2.

In another example the apparatus for transmitting the data symbols via OFDM symbols may be operable in a first multiple input single output mode in which the modulator is arranged to form the first and second versions of the OFDM symbols, and the transmitter is operable to transmit the first version via the first antenna and the second version of the OFDM symbols via a second antenna, and the apparatus is operable in a second single input single output mode. In the second single input single output mode, the modulator is arranged in operation to receive the data symbols, to modulate the data bearing sub-carriers of OFDM symbols with the data symbols, and to modulate the continuous and scattered pilot symbol sub-carrier in accordance with the same predetermined pattern of the first multiple input single output mode, and the transmitter is arranged in operation to transmit the OFDM symbol via at least one of the first and second antennae.

Thus, the apparatus for transmitting the data symbols can be operable in two modes a MISO mode in which Alamouti encoding is used and a SISO mode in which there is no Alamouti encoding, but the same pattern of pilot symbol sub-carriers can be used for both modes, thereby simplifying implementation and therefore cost of the transmitter and receiver. Thus in one example the scattered and continuous pilot symbol sub-carriers can be arranged in accordance with a Digital Video Broadcast standard such as DVB-T or DVB-T2.

As a further advantage, because the pairs of data symbols of the Alamouti cells can be arranged on the data bearing sub-carrier symbols of the OFDM symbol independently, the data symbols can be error correction encoded before being interleaved as pairs of Alamouti encoded symbol pairs thereby improving a performance of the encoding.

Various aspects and features of the present invention are defined in the appended claims. Further aspects of the present invention include a transmitter and a receiver for receiving data from Orthogonal Frequency Division Multiplexed (OFDM) symbol or symbols, and a system for communicating using OFDM symbols.

BRIEF DESCRIPTION OF DRAWINGS

Embodiments of the present invention will now be described by way of example only with reference to the accompanying drawings, wherein like parts are provided with corresponding reference numerals, and in which.

DESCRIPTION OF PREFERRED EMBODIMENTS

DVB-T2 Example

Figure 1:
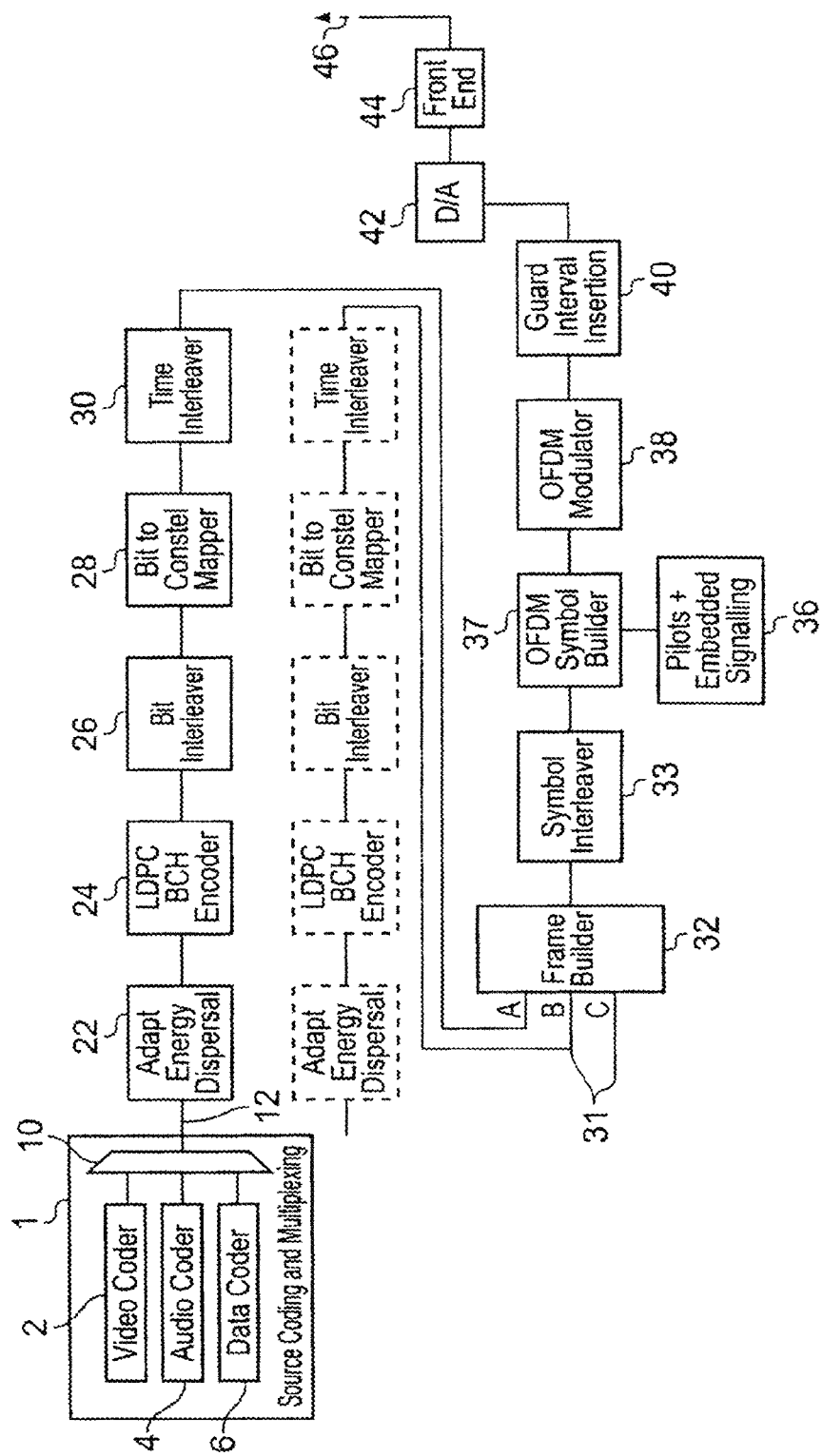
FIG. 1 is a schematic block diagram of a Coded OFDM transmitter which may be used, for example, with the DVB-T2 standard.

FIG. 1 provides an example block diagram of a Coded OFDM transmitter which may be used for example to transmit video images and audio signals in accordance with the DVB-T2 standard. In FIG. 1 a program source generates data to be transmitted by the COFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 a COFDM transmitter 20 receives the stream at a multiplexer adaptation and energy dispersal block 22. The multiplexer adaptation and energy dispersal block 22 randomizes the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point, which is to be used for conveying the encoded data bits. The outputs from the bit into constellation mapper 28 are constellation point labels that represent real and imaginary components. The constellation point labels represent data symbols formed from two or more bits depending on the modulation scheme used. These data symbols are passed through a time-interleaver 30 whose effect is to interleaver data symbols resulting from multiple LDPC code words.

The data symbols are received by a frame builder 32, with data symbols produced by branch B etc in FIG. 1, via other channels 31. The frame builder 32 then forms many data symbols into sequences to be conveyed on COFDM symbols, where a COFDM symbol comprises a number of data symbols, each data symbol being mapped onto one of the sub-carriers. The number of sub-carriers will depend on the mode of operation of the system, which may include one of 1k, 2k, 4k, 8k, 16k or 32k, each of which provides a different number of sub-carriers according, for example to the following table:

| Mode | Sub-carriers |
|------|--------------|
| 1K   | 756          |
| 2K   | 1512         |
| 4K   | 3024         |
| 8K   | 6048         |
| 16K  | 12096        |
| 32K  | 24192        |

Number of Sub-carriers Adapted from DVB-T/H

Thus in one example, the number of sub-carriers for the 16k mode is twelve thousand and ninety six.

Each frame comprises many such COFDM symbols. The sequence of data symbols to be carried in each COFDM symbol is then passed to the symbol interleaver 33. The COFDM symbol is then generated by a COFDM symbol builder block 37 which uses the constellation data labels to generate the real and imaginary parts of the constellation points and also introducing pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue converter 42 and finally to an RF amplifier within an RF front 44 for eventual broadcast by the COFDM transmitter from an antenna 46.

Example Transmitter

Figure 2:
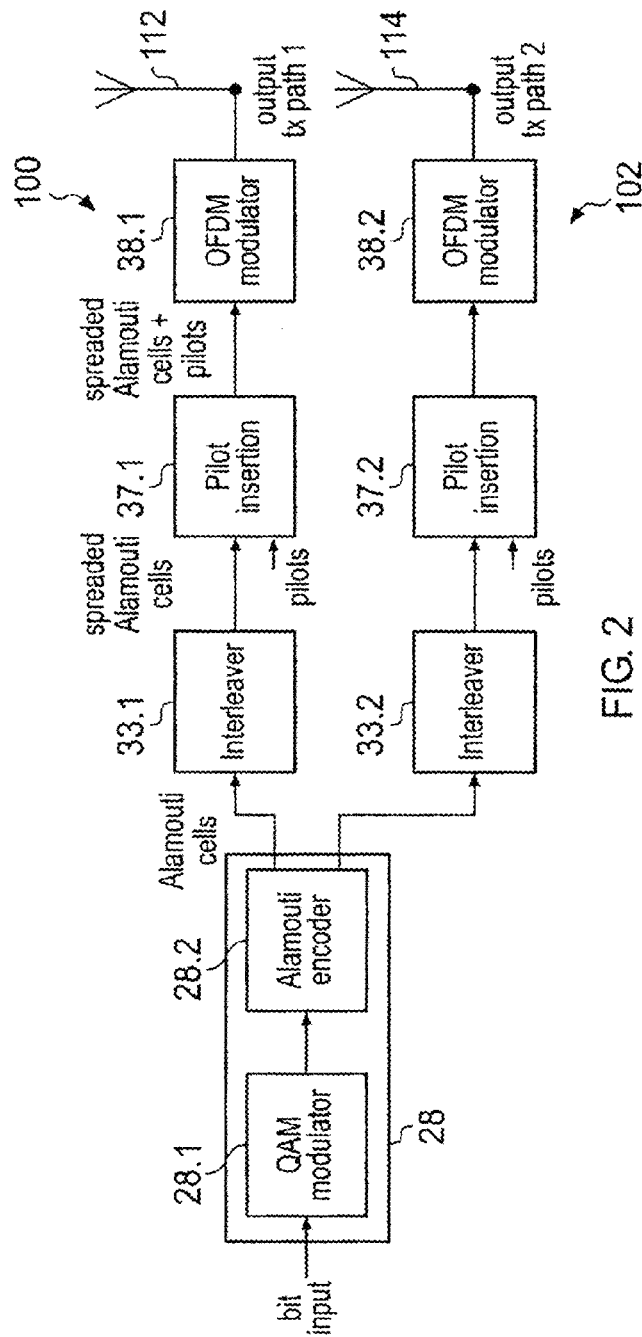
FIG. 2 is a schematic block diagram of parts of the transmitter shown in FIG. 1 adapted to illustrate an example of the present technique.

An example transmitter which utilises the present technique is shown in FIG. 2, which includes parts of the transmitter shown in FIG. 1, which are relevant to the explanation of the present technique. Thus some parts of the DVB-T2 transmitter shown in FIG. 1 have been omitted for clarity. In FIG. 2, the data to be transported is received by the bit to constellation mapper 28, which forms the data to be transported by an OFDM symbol or symbols into pairs of symbols.

As will be explained below, the data symbols are formed into pairs because the space time/frequency block codes used are Alamouti codes. As will be explained, the Alamouti encoding can be done either in space time or space frequency. As such the pairs of symbols formed within a QAM modulator 28.1 are either transported by the same OFDM symbol using different sub-carriers, or transported using two different OFDM symbols using the same sub-carrier in each symbol, one for each of the data symbols. As explained below the pair of data symbols are used to generate first and second pairs of modulation symbols, the first pair providing first and second data symbols (S1, −S2*) of an Alamouti cell and the second pair of modulation symbols provide the third and fourth data symbols (S2,−S1*) of the Alamouti cell.

The pairs of data symbols for communication on one or two OFDM symbols are mapped by the QAM modulator 28 onto QAM modulation symbols. An Alamouti encoder 28.2 receives the modulation symbols from the QAM modulator 28 and forms pairs of modulation symbols (S1, S2) corresponding to each of the pairs of data symbols into the first and second pairs of an Alamouti cell $((s_1, -s_2^*) (s_2, -s_1^*))$. As explained below the first and second pairs of symbols are used to modulate different sub-carriers of first and second versions of the same OFDM symbol (space-frequency) or the same sub-carrier of first and second versions of different OFDM symbols (space-time). Each of the versions of the symbol or symbols are transmitted respectively via the upper branch 100 or the lower branch 102.

As mentioned above, although Alamouti encoding typically requires that the modulation symbols are transmitted for example in adjacent sub-carriers (space-frequency), embodiments of the present technique can allow the modulation symbols to be allocated to data bearing sub-carriers of the OFDM symbol or symbols more freely. Accordingly, the transmitter shown in FIG. 2 includes an interleaver 33.1, 33.2 for each of the upper and lower branches 100, 102, which is arranged to inter-leave the modulation symbols within the frame of modulation symbols for transmission on the sub-carriers of the OFDM symbol or symbol. The interleaver of the two different transmit paths has to be the same for the time duration of one OFDM symbol. Applying different inter-leaver patterns for different OFDM symbols in time direction is possible and increases the diversity in an additional way (again: For both transmit paths the same interleaver is used per OFDM symbol in time direction).

The frame of data symbols for transmission are then received for each branch by pilot insertion blocks 37.1, 37.2 which form the pilot symbols within each version of the OFDM frame for modulating the pilot carriers. Finally the frame of modulation symbols and pilot symbols are received by an OFDM modulator 37.1, 37.2, which generates each version of the OFDM symbol or symbols for transmission via respective antennas 112, 114.

Alamouti Space Frequency/Time Block Coding

Figure 3:
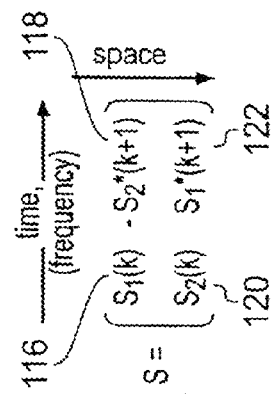
FIG. 3 is an example illustration of an Alamouti encoding matrix.

The Alamouti scheme is a simple but very efficient space-time or space-frequency coding scheme for MIMO/MISO systems with two transmit ports. The encoding can be described by the encoding matrix shown in FIG. 3, which labels for the Alamouti encoding matrix the first, second, third and fourth modulation symbols 116, 118, 120, 122 of an Alamouti cell, which are formed from two symbols $s_1$ and $s_2$.

The original Alamouti scheme transmits the symbols $s_1$ and $s_2$ at the first time instant k over transmit port 1 and 2. At the next time instant k+1 $-s_2^*$ and $s_1^*$ are transmitted via transmit port 1 and 2, respectively. Combined with OFDM, Alamouti encoding can be applied in two different ways: Space-frequency encoding indicates that k and k+1 are assigned to two adjacent sub-carriers of the same OFDM symbol, while for space-time coding k and k+1 maps onto the same sub-carrier of two consecutive OFDM symbols.

Figure 4:
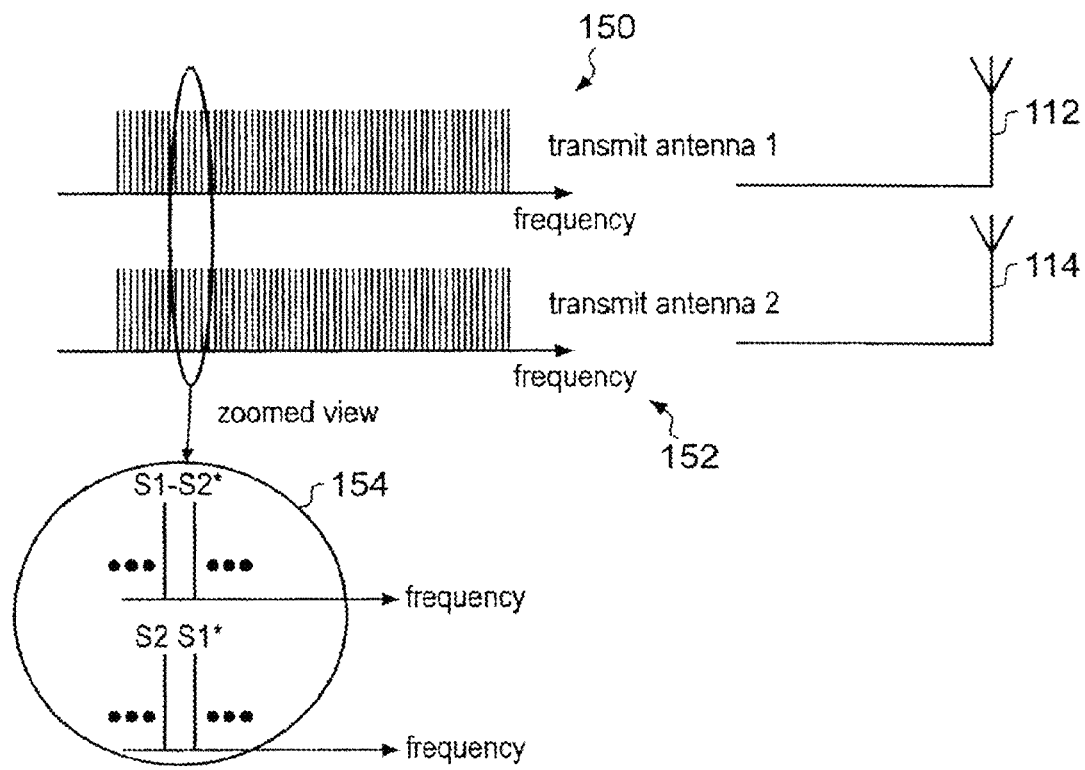
FIG. 4 is a schematic block diagram illustrating a space-frequency Alamouti encoding technique.

An example of space-frequency encoding for application to OFDM is shown in FIG. 4. In FIG. 4, in accordance with the transmitter shown in FIG. 2, two versions of the OFDM symbol are generated one for transmission via each antennas 112, 114 for each of the upper and lower branches 100, 102. Thus the two versions 150, 152 each respectively carry the first and second pairs of modulation symbols (($s_1$, $-s_2^*$) ($s_2$, $s_1^*$)) respectively as shown within an expanded view 154.

Since the columns of S are orthogonal, the Alamouti scheme belongs to the class of orthogonal codes, which allows a simple decoding: For classical decoding of space-time coded Alamouti it is assumed that successive OFDM symbols experience the same channel conditions. On the other hand, space-frequency Alamouti scheme requires that the channel matrices of adjacent sub-carriers are equal (typically true for a sufficiently large number of sub-carriers).

Figure 5:
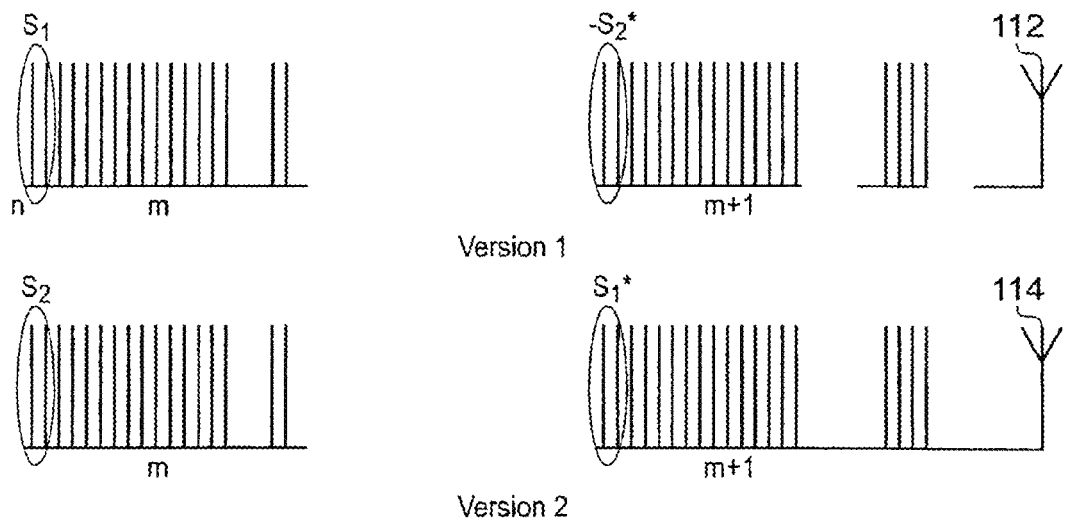
FIG. 5 is a schematic block diagram illustrating a space-time Alamouti encoding technique.

In contradiction to space-frequency Alamouti, space-time Alamouti is encoded in a different way, which is illustrated in FIG. 5. The incoming symbols S1 and S2 are assigned pair wise as follows. S1 is sent on a subcarrier n of OFDM symbol m on the first transmission antenna 112. On the next OFDM symbol m+1 in time, the symbol $-S2^*$ is sent on the same sub-carrier n on the first antenna 112. In the same way, S2 is sent on a sub-carrier n of OFDM symbol m on the second transmission antenna 114. On the next OFDM symbol m+1 in time, the modulation symbol S1* is sent on the same sub-carrier n on the second antenna 114.

Figure 6:
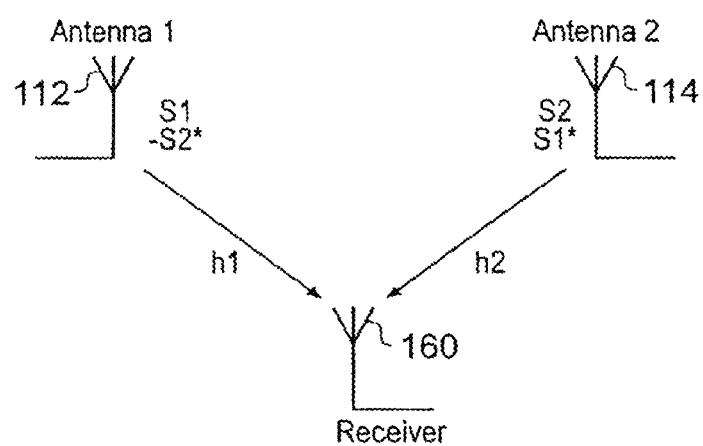
FIG. 6 is a schematic diagram of a MISO system illustrating the present technique.

Alamouti encoding is basically applicable to an arbitrary number of receive antennas. For a better understanding the classical decoding algorithm is explained for the MISO case as illustrated in FIG. 6. In FIG. 6, one receive antenna 160, is provided in correspondence with an example in space-frequency encoding, in which each version of the OFDM symbol is transmitted by a different transmitter antenna 112, 114.

From the first sub-carrier, the receiver receives the following signal r1 (second index (y) of $h_{xy}$ channel indices indicates the sub-carrier number).

$$r1 = h11 \cdot S1 + h21 \cdot S2 \qquad (1)$$

In the same way, the receiver receives the following signal r2:

$$r2 = -h12 \cdot S2^* + h22 \cdot S1^* \qquad (2)$$

In classical linear Alamouti decoding, an important precondition is assumed: Neighbored subcarriers have the same channel coefficient:

$$h1 = h11 = h12 \qquad (3)$$

$$h2 = h21 = h22 \qquad (4)$$

With this assumption, (1) and (2) can be solved easily for s1 and s2:

$$\hat{s}1 = \frac{1}{(|h1|^2 + |h2|^2)} \cdot (h1^* \cdot r1 + h2 \cdot r2^*)$$

$$\hat{s}2 = \frac{1}{(|h1|^2 + |h2|^2)} \cdot (h2^* \cdot r1 - h1 \cdot r2^*)$$

Figure 7:
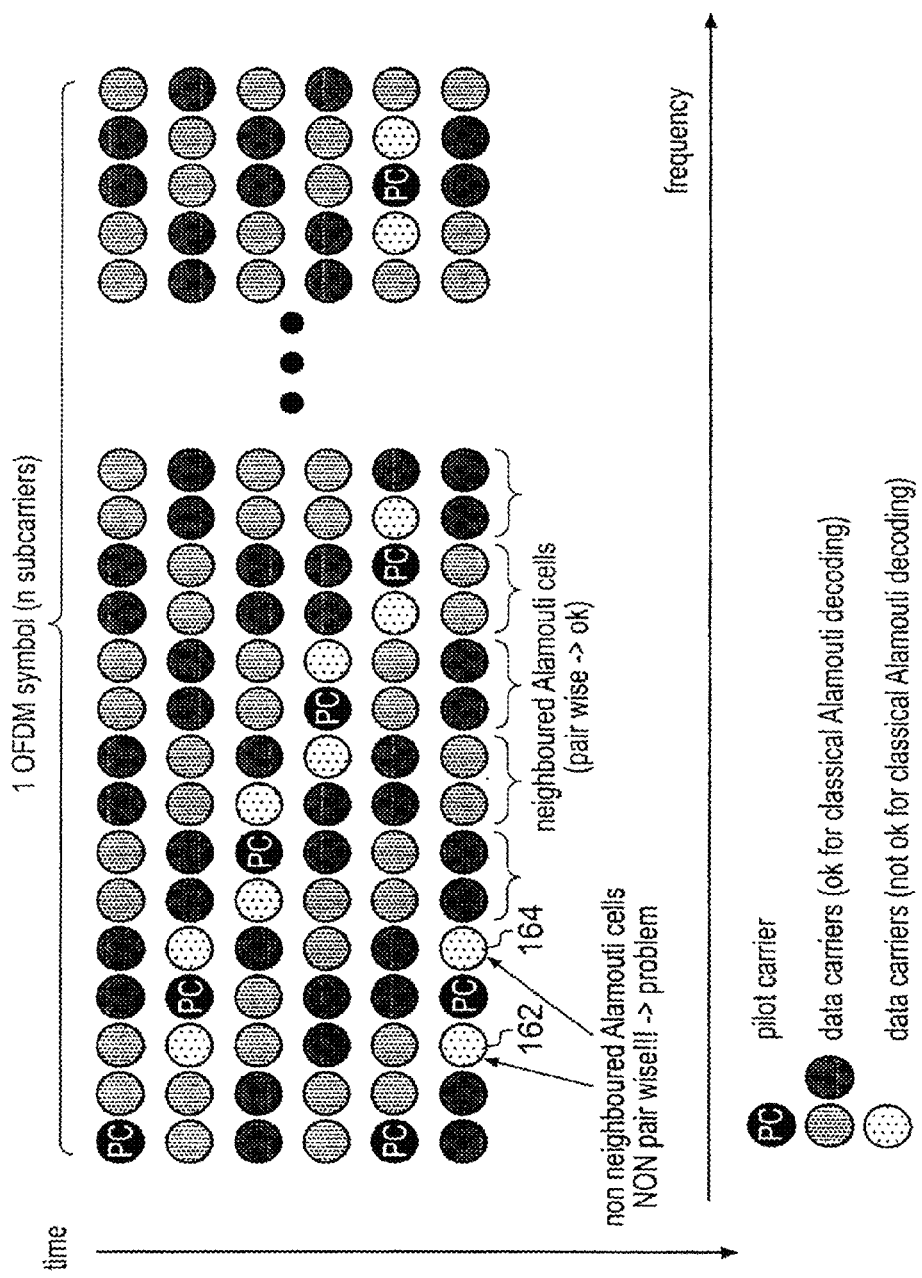
FIG. 7 is an illustration of a plurality of OFDM symbols showing a distribution of pilot carriers with data sub-carriers.

If classical Alamouti decoding is used, the pair-wise encoded input symbols have to be neighbored (in time or in frequency) to fulfill the condition that the channel coefficient is sufficiently equal (see above). However, many OFDM systems use pilot carriers that are used inside an OFDM symbol to perform channel estimation and channel tracking. These pilots are located in an intelligent way to fulfil all channel estimation and tracking requirements:

continuous pilots for synchronization and channel tracking
scattered pilots for channel estimation The location of the pilot patterns does not normally match in all cases to the requirement of Alamouti decoding (for both directions, frequency or time) mentioned above. Therefore, for a conventional OFDM transmission system such as that proposed for DVB-T, both continuous and scattered pilots are used throughout the OFDM symbol, as illustrated in FIG. 7. As shown in FIG. 7, the pilot carriers PC are positioned though-out each OFDM symbol. As a result, whilst some pairs of modulation symbols can be allocated to adjacent sub-carriers, otherwise must be allocated to sub-carriers with a pilot carrier there-between, such as the sub-carriers 162, 164 located in the final row 166.

One solution might be to apply a different pilot pattern, so that the pilot pattern is limited to ensuring that the pairs of sub-carriers allocated for each pair of the modulation symbols of an Alamouti cell fulfils the Alamouti requirement, resulting in a degraded pilot functionality or a higher overall number of pilots (resulting in a degraded throughput rate). In addition, the ordering complexity between pilots and data carriers increases.

Alamouti Decoding Technique

The present technique provides a way of allowing Alamouti encoding to be used with mixed pilots and Alamouti pairs. As a result, there is no pre-condition for the placement of the pilot carriers. Preferably, in order to ensure that the available sub-carriers are used with greatest efficiency for the Alamouti encoded data carriers, the number of sub-carriers for data should be even, so that the available sub-carriers x can be aligned completely to x/2 Alamouti cells.

The present technique uses a known alternative decoding method for Alamouti encoded signals. The decoding technique overcomes the pre-condition that neighbored symbols (in time or frequency) must have the same channel coefficient. Starting again from equations (1) and (2) without the precondition of equal channel coefficients delivers still the possibility to solve for s1 and s2. In this case the resulting equations are:

$$\hat{s1} = \frac{1}{h11 \cdot h12^* + h21 \cdot h22^*} \cdot (h12^* \cdot r1 + h21 \cdot r2^*)$$

$$\hat{s2} = \frac{1}{h11 \cdot h12^* + h21 \cdot h22^*} \cdot (h22^* \cdot r1 - h11 \cdot r2^*)$$

This decoding method was proposed to resolve bit errors that are caused by non equal neighbored symbol channel coefficients. The decoding method can be referred to as a Zero Forcing (ZF) solution, which can be represented as:

$$\hat{s} = H^{-1} r$$

where $$\hat{s} = \begin{pmatrix} \hat{s1} \\ \hat{s2} \end{pmatrix}, H = \begin{pmatrix} h_{11} - h_{21} \\ h_{21}^* {}^* h_{22} \end{pmatrix} \text{ and } r = \begin{pmatrix} r1 \\ r2 \end{pmatrix}.$$

Other pseudo-inverse solutions also exist, including a Minimum Mean Squared Error (MMSE) solution, which is represented as:

$$\hat{s} = (H^*H + \alpha^2 I)^{-1} H^* r$$

Since the channel coefficients are no longer coupled in any way, the Alamouti cells do not have to be neighbored.

As a first result, cells that are "interrupted" by a pilot carrier as illustrated in FIG. 6 can be decoded with this technique with a negligible degradation in the performance of the OFDM communications system, compared with the classical Alamouti decoding technique. Furthermore, since the above decoding method can be used for modulation symbols of an Alamouti cell, which can be separated by a pilot carrier, in fact those modulation symbols can be separated by any amount. As a result, and as explained above for the receiver of FIG. 2, not only can the pilot carriers be arranged in any desired manner, but the modulation symbols can be distributed after encoding throughout the OFDM symbol or symbol. Therefore the interleavers 104, 106 can interleave the modulation symbols of the Alamouti cells to improve the performance of the error correction encoded, which is used, such as the LDPC encoders shown in FIG. 1.

Two main advantages provided by allowing the modulation symbols of the Alamouti cells to be distributed as desired are:
  Alamouti encoding is completely decoupled from pilot spacing: Even if a cell is interrupted by a pilot, the performance of the communication system after decoding is not significantly degraded. As mentioned above, preferably for space-frequency Alamouti encoding the number of data carriers should be even (i.e. integer number of Alamouti cells per OFDM symbol)
  The two modulation symbols of an Alamouti cell can be distributed in time and/or frequency to increase the diversity in one more dimension, for example by using an interleaver stage.

Further Transmitter Examples

Figure 8:
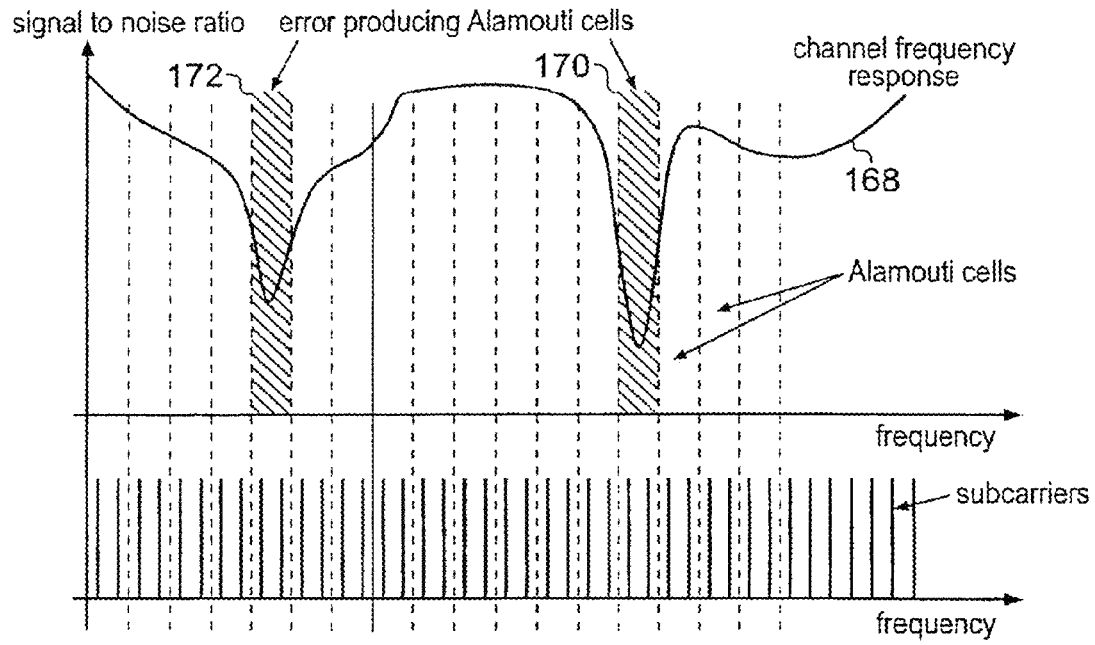
FIG. 8 is a graphical plot of signal to noise ratio shown with respect to frequency illustrated against a positioning of sub-carriers for Alamouti cells.

FIG. 8 provides a graphical plot 168 of signal to noise ratio against frequency for each of the sub-carriers in the OFDM symbol. As illustrated in FIG. 8, there are areas 170, 172, in which the channel response has a low signal to noise ratio. As a result, the modulation symbols of the Alamouti cells in these areas are likely to produce bit errors, even if an additional coding gain from Alamouti is considered.

Figure 9:
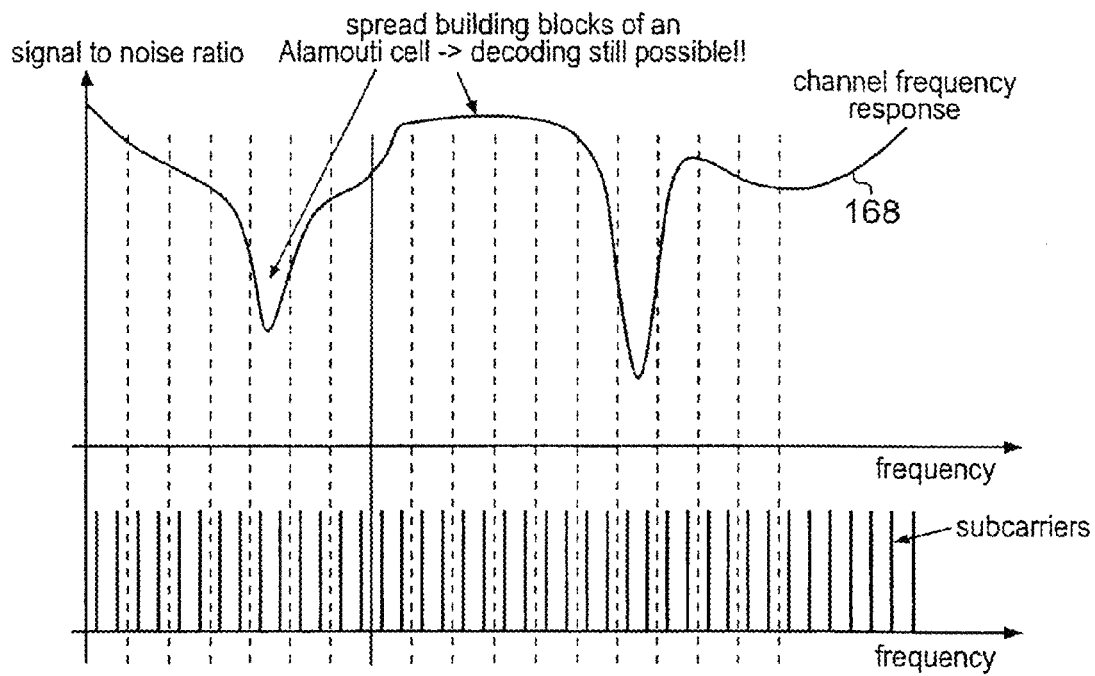
FIG. 9 is a graphical plot of signal to noise ratio shown with respect to frequency illustrated for interleaved Alamouti cells.

The present technique proposes to interleave the modulation symbols of each of the Alamouti cells over a system specific range in frequency and time. If the example of a frequency interleaver is used for the example shown in FIG. 8, then the two modulation symbols of an Alamouti cell will spread over the available frequency range, as shown in FIG. 9. As a result, Alamouti decoding is possible if only one of the building blocks is received with a sufficiently good signal-to-noise ratio. Therefore, as soon as one modulation symbol of the Alamouti cell is located on a frequency with good signal-to-noise, decoding is possible. The number of bit errors should therefore decrease as a result of the additional diversity, and this technique will be even more beneficial if combined with error correction encoding.

Figure 10:
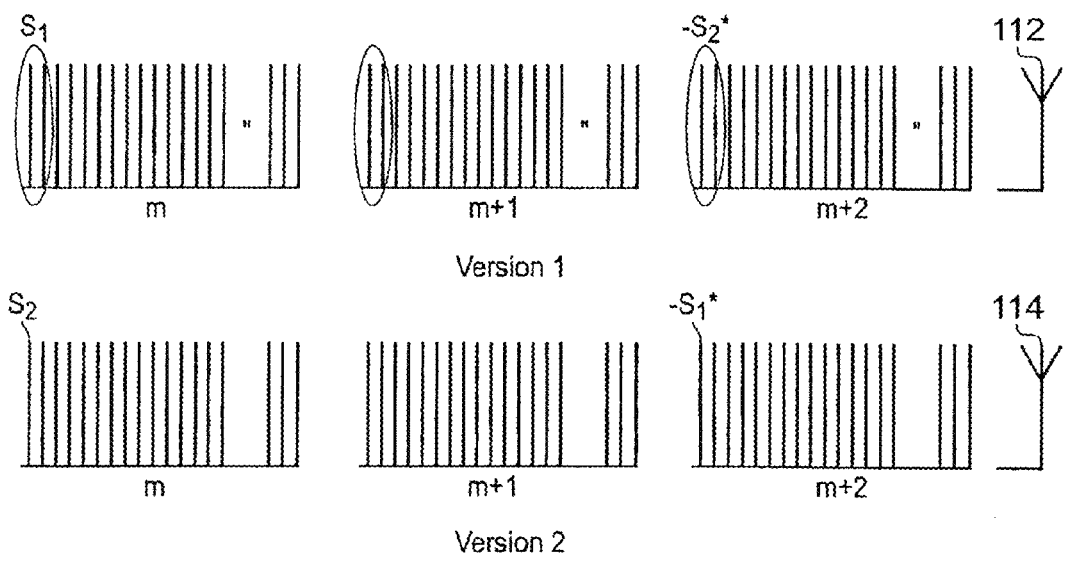
FIG. 10 is a schematic illustration of OFDM symbols encoded for a space-time Alamouti encoding.

A further example of the transmitter shown in FIG. 2 operating to perform space-time Alamouti encoding is shown in FIG. 10. As illustrated for the example shown in FIG. 5 for the space-frequency encoding, the modulation symbols of an Alamouti cell are distributed on two OFDM symbols, for which two versions are generated, one for transmission from each of the antennas 112, 114. However, in accordance with the present technique, instead of the first and second OFDM symbols having to be consecutive, one or more other OFDM symbols may be inter-posed between the two OFDM symbols which are carrying the modulation symbols of the Alamouti cell. For example, the OFDM symbol transmitted at position m and m+2 are arranged to carry the modulation symbols of the Alamouti cells. However, an OFDM symbol can be transmitted at position m+1 carrying other data, which may be interleaved with the data carried by the OFDM symbols m, m+2.

Receiver Examples

Figure 11:
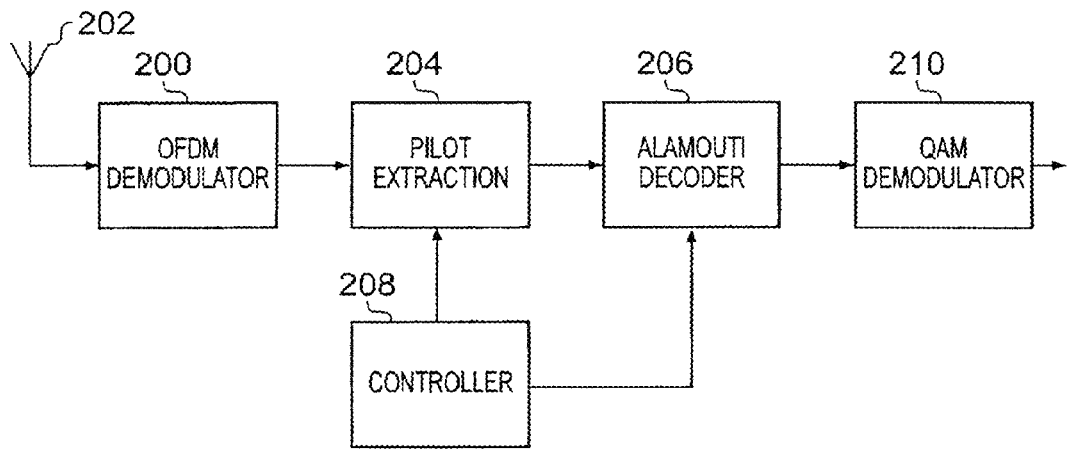
FIG. 11 is a schematic block diagram of an example receiver according to the present technique.

An example receiver which utilises the present technique to decode Alamouti encoded data, which has been transmitted by the transmitter shown in FIG. 2, is provided in FIG. 11. FIG. 11 considers the example, in which the modulation symbols of the Alamouti cell have not been interleaved, as illustrated by the example shown in FIG. 7. FIG. 11 provides a simplified block diagram of an OFDM receiver, providing only those block which are required to illustrate the present technique. In FIG. 11, an OFDM de-modulator 200 receives an OFDM symbol or symbols detected by a receiver antenna 202 and converts the symbol into the time domain so that the pilot carriers can be extracted by the pilot extraction block 204. The pilot symbols are of course used as part of the detection process to perform channel estimation and synchronisation. The pilot carrier symbols are extracted to recover the modulation symbol bearing sub-carriers, which are fed to the Alamouti decoder 206.

A controller 208 provides a pattern of the pilot carriers, which is know to the receiver, to the pilot extraction block 204. The controller also controls the Alamouti decoder 208 in accordance with the pilot pattern. The modulation symbols of the Alamouti cells are decoded by the Alamouti decoder 206 using either the simplified decoding technique, which assumes that the frequency response coefficient is the same (as explained above) for each modulation symbol for the Alamouti cell being decoded. This decoding technique can be applied to the modulation symbols of Alamouti cells which have been transmitted and received using adjacent sub-carriers in the OFDM symbol. However, for those modulation symbols for Alamouti cells transmitted and received by sub-carriers which are separated, by for example a pilot carrier, then the Alamouti decoder 206 detects the modulation symbols by using an estimate of a coefficient of the channel frequency response corresponding to the position of each of the sub-carriers within each of the first and second versions of the OFDM symbol (space-frequency) or the first and second OFDM symbols (space-time), and corresponding to each of the first and second versions or the first and second OFDM symbols. Thus the controller 208 controls the decoding by the Alamouti decoder so that the computationally more complicated Alamouti decoding process is performed only for those modulation symbols of the Alamouti cells, which are transmitted and received via sub-carriers which are separated by other sub-carriers or pilot carriers.

Once the pairs of modulation symbols have been recovered by the Alamouti decoder 206, they are fed to a QAM de-modulator 210, which de-modulates the QAM symbols to recover the data bits, which the QAM symbols represent.

Figure 12:
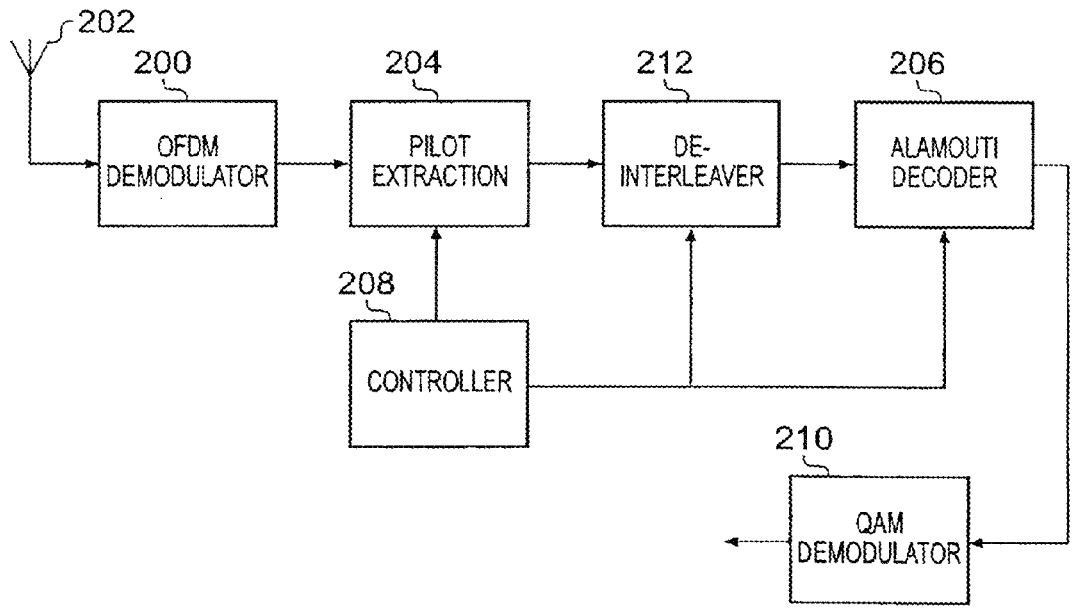
FIG. 12 is a schematic block diagram of a further example receiver according to the present technique.

FIG. 12 provides an example of a receiver for detecting data from an OFDM symbol, in which the modulation symbols of the Alamouti cells have been interleaved so that, as far as possible, none of the modulation symbols are carried on neighboring sub-carriers of the OFDM symbol. The example shown in FIG. 12, therefore operates in the same way as the receiver shown in FIG. 11, except that a de-interleaver 212 is provided to de-interleave the modulation symbols of the Alamouti cells. Furthermore, since all the modulation symbols of the Alamouti cells are transmitted on non-neighboring sub-carriers, then the more complicated decoding process of the Alamouti cells must be performed by estimating a coefficient of the channel frequency response corresponding to the position of each of the sub-carriers within each of the first and second versions of the OFDM symbol (space-frequency) or the first and second OFDM symbols (space-time).

Interleaver Schemes

Depending on the OFDM system parameters and the channel behaviour, the design of the interleaver looks different. A few examples are listed below:

Frequency Interleaver

As mentioned above, the modulation symbols of an Alamouti cell should be spread by a frequency interleaver: The goal is to distribute the building blocks of the Alamouti cells in a best possible way. An example for such a system is the frequency interleaver of DVB-T/DVB-T2. The used distribution sequence was designed in a way to obtain a maximum average distance between neighbored QAM symbols (in our case: 1 Alamouti cell modulation symbol), while guaranteeing additionally a minimum distance.

Figure 13:
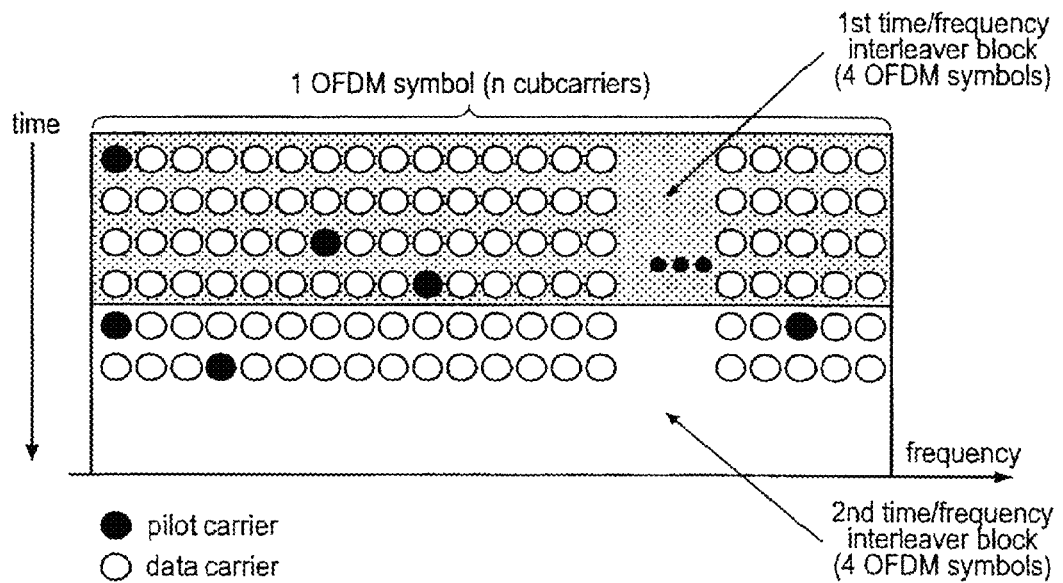
FIG. 13 is a schematic illustration showing how modulation symbols of Alamouti cells can be spread over several OFDM symbols.

Frequency/Time Interleaver:

Spreading the Alamouti cell building blocks can also be applied to a dedicated frequency AND time range. Two examples are mentioned here:

The spread is applied to several complete OFDM symbols. Depending on the channel characteristics this may give further advantage. The following picture shows the principle: Several complete OFDM symbols in time are used as spreading range of the interleaver (see FIG. 13)

Figure 14:
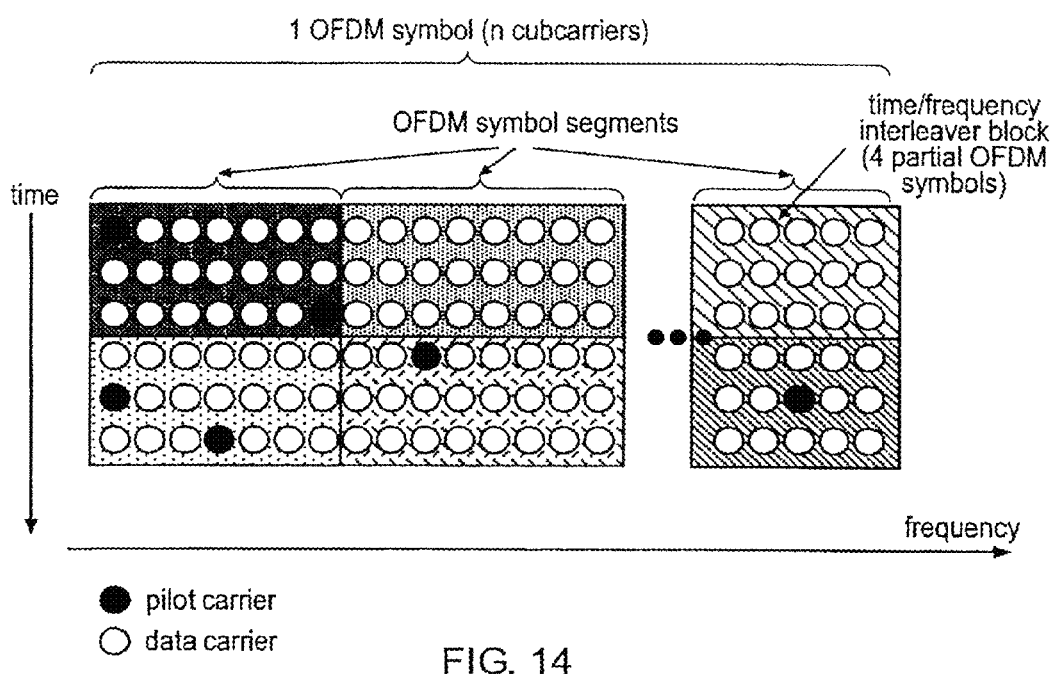
FIG. 14 is a schematic illustration showing how modulation symbols of Alamouti cells can be spread over several OFDM symbol segments.

The spread is applied to several partial OFDM symbols. Systems like ISDB-T use not the complete number of OFDM carriers but only a subset block (e.g. 1 segment ISDB-T). In this case several of the related subcarrier blocks are combined as interleaver range (see FIG. 14)

Figure 15:
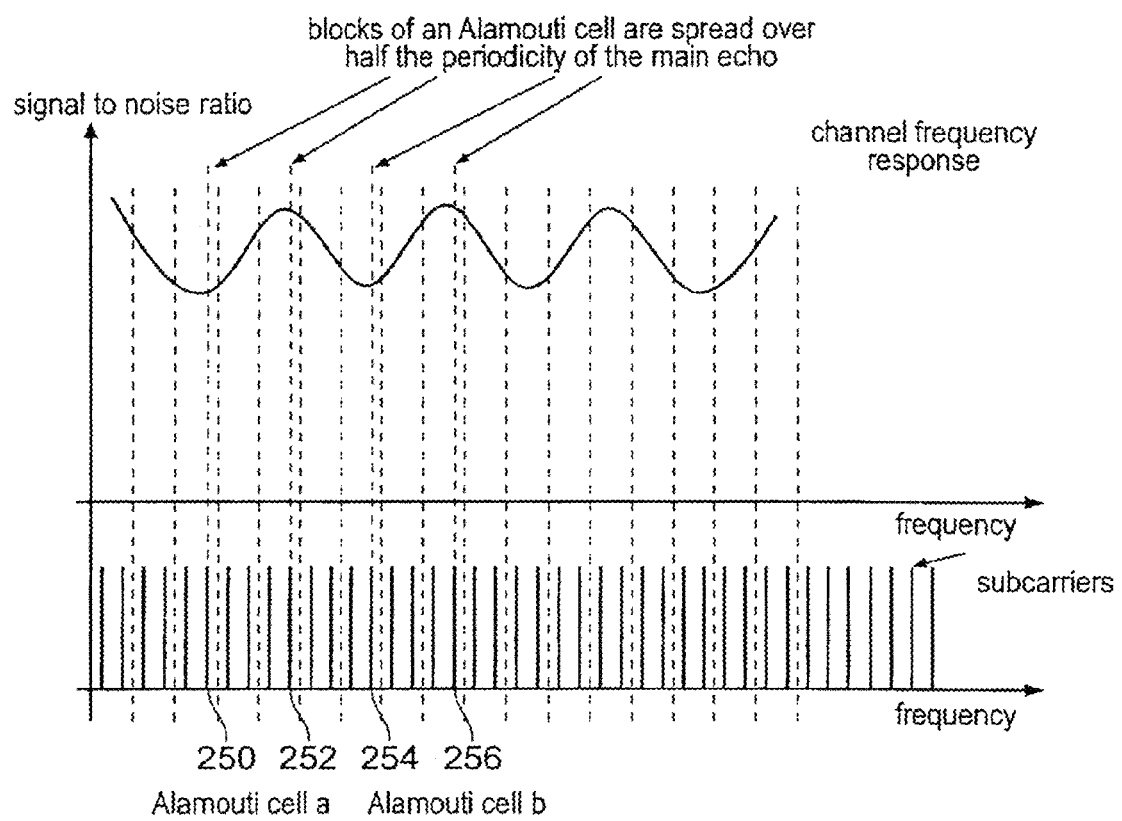
FIG. 15 is schematic illustration of how modulation symbols of Alamouti cells can be spread depending on the channel frequency response periodicity.

The present technique could be applied in a more intelligent way to bidirectional communication systems, where the receiver can inform the transmitter about the channel characteristics: Dominant echo paths result in a periodic fading behaviour in the channel frequency response. Generally, the periodicity in frequency is the reciprocal value of the delay length (example: echo with 1 usec-> periodicity in frequency=1 MHz). It is proposed to introduce a frequency block interleaver that spreads the Alamouti cell building block over half this periodicity number. As a result, each Alamouti cell contains at least one block with good SNR conditions, error free decoding is possible for all Alamouti cells. FIG. 15 illustrates the relation for two Alamouti cells 250, 252, 254, 256 that are spread over a high and a low SNR area:

Note: It is also possible to introduce a frequency block interleaver that spreads the Alamouti cell building block over n half this periodicity number. n is an arbitrary odd number and increases the spread range over the frequency.

In other implementations an apparatus for transmitting data symbols utilises first and second Orthogonal Frequency Division Multiplexed (OFDM) symbols, the OFDM symbols comprising a plurality of data bearing sub-carriers and one or more pilot sub-carriers. The apparatus includes a modulator and a transmitter. The modulator is operable to receive data symbols for communicating via the OFDM symbols, to form the data symbols into pairs, to generate a first pair of modulation symbols for each of the pairs of data symbols, the first pair of modulation symbols forming first and second modulation symbols of an Alamouti cell, to form a first version of the first of the OFDM symbols and a first version of the second of the OFDM symbols by modulating the same sub-carrier in each with a different one of the first and second modulation symbols of the Alamouti cell, to modulate the one or more pilot carriers of the first version of the OFDM symbols, to generate a second pair of modulation symbols for each of the pairs of data symbols, the second pair of modulation symbols forming third and fourth modulation symbols of the Alamouti cell formed for the pair of data symbols in the first version of the OFDM symbols, to form a second version of the first of the OFDM symbols and a second version of the second of the OFDM symbols by modulating the same sub-carrier in each with a different one of the third and fourth modulation symbols of the Alamouti cell respectively, and to modulate the one or more pilot carriers of the second version of the OFDM symbols. The transmitter is arranged in operation to transmit the first version of the first and second OFDM symbols via a first antenna, and the second version of the first and second OFDM symbols via a second antenna, wherein for at least one of the pairs of data symbols, the first and second OFDM symbols are transmitted with a temporal displacement between them.

In another implementation of an apparatus for receiving data, the apparatus is arranged to receive the data from first and second Orthogonal Frequency Divisional Multiplexed (OFDM) symbols, the first and second OFDM symbols comprising a plurality of data bearing sub-carriers and one or more pilot carriers, the data bearing sub-carriers carrying data symbols which are paired. The apparatus comprises a receiver and a demodulator. The receiver is arranged to receive a first version of the first and the second OFDM symbols via a first antenna, and to receive a second version of the first and the second OFDM symbols via a second antenna. The demodulator is arranged in operation to form an estimate of a first pair of modulation symbols for each of the pairs of data symbols from the first version of the first and second OFDM symbols, using the one or more pilot sub-carriers, the first pair of modulation symbols forming first and second modulation symbols of an Alamouti cell, the estimate of the first modulation symbol being formed from a sub-carrier from the first OFDM symbol and the second modulation symbol being formed from a sub-carrier in the same position in the second OFMD symbol, to form an estimate of a second pair of modulation symbols for each of the pairs of data symbols from the second version of the first and second OFDM symbols, using the one or more pilot carriers, the second pair of modulation symbols forming third and fourth modulation symbols of the Alamouti cell, the estimate of the third modulation symbol being formed from a sub-carrier from the first OFDM symbol and the fourth modulation symbol being formed from a sub-carrier in the same position in the second OFMD symbol, a data detector operable to generate an estimate of each of the pairs of the data symbols from the first and second modulation symbols and third and fourth modulation symbols corresponding to each of the Alamouti cells recovered from the first and second versions of the first and second OFDM symbols, wherein the first and second OFDM symbols are separated in time by at least one other OFDM symbol, and the data detector is operable to detect the pair of data symbols carried by the sub-carriers using a different estimate of a coefficient of the channel frequency response corresponding to the position of each of the sub-carriers within each of the first and second OFDM symbols.

Furthermore the first and the second modulation symbols and the third and the fourth modulation symbols of at least some of the Alamouti cells may be carried by the same sub-carrier within the first and second versions of the first and second OFDM symbols respectively, and the data detector may be operable to detect the pair of data symbols carried by the OFDM symbols, by assuming that a coefficient of the channel frequency response corresponding to the position of the sub-carrier within each of the first and second versions of the first and second OFDM symbols is the same.

In another example, the data detector may be operable to adapt a detection technique depending on whether the pairs of data symbols are detected from consecutive OFDM symbols or OFDM symbols separated by an amount of time corresponding to at least one other OFDM symbol.

According to another implementation example, there is provided method of transmitting data via first and second Orthogonal Frequency Division Multiplexed (OFDM) symbols. The OFDM symbols comprise a plurality of data bearing sub-carriers and one or more pilot carriers. The method includes receiving data symbols for communicating via the OFDM symbols, forming the data symbols into pairs, generating a first pair of modulation symbols for each of the pairs of data symbols, the first pair of modulation symbols forming first and second modulation symbols of an Alamouti cell, forming a first version of the first of the OFDM symbols and a first version of the second of the OFDM symbols by modulating the same sub-carrier in each with a different one of the first and second modulation symbols of the Alamouti cell, modulating the one or more pilot carriers of the first version of the OFDM symbols, generating a second pair of modulation symbols for each of the pairs of data symbols, the second pair of modulation symbols forming third and fourth modulation symbols of the Alamouti cell formed for the pair of data symbols in the first version of the OFDM symbol or the OFDM symbols, forming a second version of the first of the OFDM symbols and a second version of the second of the OFDM symbols by modulating the same sub-carrier in each with a different one of the third and fourth modulation symbols of the Alamouti cell respectively, modulating the one or more pilot carriers of the second version of the OFDM symbols, and transmitting the first version of the first and second OFDM symbols via a first antenna, and the second version of the first and second OFDM symbols via a second antenna, wherein for at least one of the pairs of data symbols, the first and second OFDM symbols are transmitted with a temporal displacement.

According to another example there is provided method of receiving data from first and second Orthogonal Frequency Divisional Multiplexed (OFDM) from symbols. The OFDM symbols comprise a plurality of data bearing sub-carriers and one or more pilot carriers. The data bearing sub-carriers carry data symbols which are paired. The method includes receiving a first version of the first and the second OFDM symbols transmitted via a first antenna, receiving a second version of the first and the second OFDM symbols transmitted via a second antenna, forming an estimate of a first pair of modulation symbols for each of the pairs of data symbols from the first version of the first and second OFDM symbols, using the one or more pilot carriers, the first pair of modulation symbols forming first and second modulation symbols of an Alamouti cell, the estimate of the first modulation symbol being formed from a sub-carrier from the first OFDM symbol and the second modulation symbol being formed from a sub-carrier in the same position in the second OFMD symbol, forming an estimate of a second pair of modulation symbols for each of the pairs of data symbols from the second version of the first and second OFDM symbols, using the one or more pilot carriers, the second pair of modulation symbols forming third and fourth modulation symbols of the Alamouti cell, the estimate of the third modulation symbol being formed from a sub-carrier from the first OFDM symbol and the fourth modulation symbol being formed from a sub-carrier in the same position in the second OFMD symbol, generating an estimate of each of the pairs of the data symbols from the first and second pairs of modulation symbols corresponding to each of the Alamouti cells recovered from the first and second versions of the first and second OFDM symbols, wherein the first and second OFDM symbols are separated in time by at least one other OFDM symbol, and the generating an estimate of each of the pairs of data symbols comprises detecting the pair of data symbols carried by the sub-carriers using a different estimate of a coefficient of the channel frequency response corresponding to the position of each of the sub-carriers within each of the first and second OFDM symbols.

Various further aspects and features of the present invention are defined in the appended claims. Various modifications may be made to the examples described above, without departing from the scope of the present invention. For example, the present invention is not limited to DVB-T or DVB-T2, but can be applied to any example technique.

The invention claimed is:

1. An apparatus for transmitting data symbols via Orthogonal Frequency Division Multiplexed (OFDM) symbols, the OFDM symbols having a plurality of data bearing sub-carriers and one or more continuous pilot sub-carrier symbols, which are located in the same position for each of the OFDM symbols and scattered pilot sub-carrier symbols, which change position between one OFDM symbol and another, in accordance with a predetermined pattern, the apparatus comprising:
   a modulator configured to receive the data symbols for communicating via the OFDM symbols,
   to form the data symbols into pairs,
   to generate first pairs of modulation symbols for each of the pairs of data symbols, the first pair of modulation symbols forming first and second modulation symbols of an Alamouti cell,
   to form a first version of the OFDM symbols by modulating the sub-carriers allocated for carrying the one or more pilot carriers in accordance with the predetermined pattern, and modulating the sub-carriers allocated for carrying the data with the first and second modulation symbols of the Alamouti cells,
   to generate second pairs of modulation symbols for each of the pairs of data symbols, the second pairs of modulation symbols forming third and fourth modulation symbols of the Alamouti cell formed for the pair of data symbols in the first version of the OFDM symbol,
   to form a second version of the OFDM symbols by modulating the sub-carriers allocated for carrying the one or more pilot carriers in accordance with the predetermined pattern, and modulating the sub-carriers allocated for carrying the data with the third and fourth modulation symbols of the Alamouti cell,
   and
   a transmitter for transmitting the first version of the OFDM symbols via a first antenna, and the second version of the OFDM symbols via a second antenna, wherein the OFDM symbols are formed with the continuous pilot symbol sub-carriers and the scattered pilot symbol sub-carriers in accordance with the predetermined pattern without precondition on the location of the pilot sub-carrier symbols with respect to a location of the data bearing sub-carrier symbols and without allocating pilot carriers to pairs of neighbouring sub-carriers within the first and second OFDM symbols, such that for at least one of the pairs of data symbols, the sub-carriers, on which each of the modulation symbols of the first and second modulation symbols and the third and fourth modulation symbols forming the Alamouti cell are modulated, are separated within the first and second versions of the OFDM symbol by at least one other data bearing sub-carrier or one or more of the scattered or continuous pilot symbol sub-carriers.

2. The apparatus as claimed in claim 1, wherein the number of data bearing sub-carriers per OFDM symbol is even.

3. The apparatus as claimed in claim 1, wherein the modulator is arranged in operation to position the data bearing sub-carrier symbols throughout each of the OFDM symbols with the effect that as far as possible the first and second modulation symbols and the third and fourth modulation symbols forming each of the Alamouti cells are located on pairs of sub-carriers, which are adjacent or as close as possible to each other.

4. The apparatus as claimed in claim 1, wherein the apparatus is configured in a first multiple input mode in which the modulator is arranged to form the first and second versions of the OFDM symbols, and the transmitter is configured to transmit the first version via the first antenna and the second version of the OFDM symbols via the second antenna, and the apparatus is configured in a second single input mode in which the modulator is arranged in operation
   to receive the data symbols,
   to modulate the data bearing sub-carriers of the OFDM symbols with the data symbols, and
   to modulate the continuous and scattered pilot symbol sub-carriers of the OFDM symbols in accordance with the predetermined pattern, and the transmitter is arranged in operation to transmit the OFDM symbol via at least one of the first and second antennae.

5. The apparatus as claimed in claim 1, wherein the scattered and continuous pilot symbol sub-carriers are arranged in accordance with a Digital Video Broadcast standard such as DVB-T or DVB-T2.

6. The apparatus as claimed in claim 1, further comprising:
   an error correction encoder configured to encode the data symbols before being formed into the pairs, a frame builder arranged in operation to form the encoded data symbols into pairs, and an interleaver configured to receive the first and second pairs of modulation symbols, and to interleave the modulation symbols before the modulator arranges the first, second, third and fourth modulation symbols of the Alamouti cells on the data bearing sub-carriers of the first and second versions of the OFDM symbols.

7. The apparatus as claimed in claim 1, wherein the sub-carriers of each OFDM symbols are divided into logical groups, each group being associated with a different channel and the first and the second modulation symbol of the Alamouti cells are formed from the sub-carriers for each channel for a first version of the OFDM symbols and the third and the fourth modulation symbol of the Alamouti cells are formed from the sub-carriers for each channel for the second version of the OFDM symbol.

8. An apparatus for receiving data from Orthogonal Frequency Divisional Multiplexed (OFDM) symbols, which have been transmitted by the apparatus according to claim 1, the OFDM symbols having a plurality of data bearing sub-carriers and one or more continuous pilot sub-carrier symbols, which are located in the same position for each of the OFDM symbols and scattered pilot carrier symbols, which change position between one OFDM symbol and another, in accordance with a predetermined pattern, the apparatus comprising:
   a receiver for receiving a first version of the OFDM symbols transmitted from a first antenna, and a second version of the OFDM symbols transmitted from a second antenna,
   a demodulator configured
   to form an estimate of a first pair of modulation symbols for each of the pairs of data symbols from the first version of the OFDM symbols, using the one or more pilot carriers, the first pair of modulation symbols forming first and second modulation symbols of an Alamouti cell,
   to form an estimate of a second pair of modulation symbols for each of the pairs of data symbols from the second version of the OFDM symbol, using the one or more pilot carriers, the second pair of modulation symbols forming third and fourth modulation symbols of the Alamouti cell corresponding to the pair of data symbols in the first version of the OFDM symbols, a data detector configured to generate an estimate of each of the pairs of the data symbols from the first, second, third and fourth modulation symbols corresponding to each of the Alamouti cells recovered from the first and second versions of the OFDM symbols, wherein for at least one of the pairs of data symbols carried by the first and second versions of the OFDM symbols, the sub-carriers carrying the modulation symbols of the first and second modulation symbols and the third and the forth modulation symbols forming the Alamouti cells are separated within the first and second versions of the OFDM symbol respectively by at least one other data bearing sub-carrier or one or more of the pilot carriers, and the data detector is configured to detect the pair of data symbols carried by the sub-carriers which are separated by the at least one other data bearing sub-carrier or pilot carrier using a different estimate of a coefficient of the channel frequency response corresponding to the position of each of the sub-carriers within each of the first and second versions of the OFDM symbol.

9. The apparatus as claimed in claim 8, wherein the first and the second modulation symbols and the third and the fourth modulation symbols of at least some of the Alamouti cells are carried by adjacent sub-carriers within the first and second versions of the OFDM symbol respectively, and the data detector is configured to detect the pair of data symbols carried by the sub-carriers by assuming that a coefficient of the channel frequency response corresponding to the position of each of the sub-carriers within each of the first and second versions of the OFDM symbol are the same.

10. The apparatus as claimed in claim 8, wherein the data detector is configured to adapt a detection technique depending on whether the pairs of data symbols are detected from sub-carriers which are adjacent or whether the sub-carriers have one or more other sub-carriers or pilot carriers interposed there between.

11. The apparatus as claimed in claim 8, wherein the data detector is configured to detect the pair of data symbols of the Alamouti cells carried by the sub-carriers using a different estimate of a coefficient of the channel frequency response for each data symbol of the cell to recover an estimate of the pairs of the data symbols from the Alamouti cells for each of the data bearing sub-carriers within the OFDM symbol regardless of the position of the data bearing sub-carriers.

12. The apparatus as claimed in claim 11, wherein the data detector uses a zero forcing or minimum mean square error technique to recover an estimate of the pairs of data symbols of each of the Alamouti cells.

13. The apparatus as claimed in claim 8, wherein the data symbols have been error correction encoded and interleaved, the apparatus further comprising:

a de-interleaver for de-interleaving the first and the second modulation symbols and the third and fourth modulation symbols of each of the Alamouti cells, the data detector being arranged to detect the modulation symbols for the de-interleaved modulation symbols of the Alamouti cells, and a decoder for error correction decoding the data symbols recovered from the detected modulation symbols provided by the data detector.

14. A method of transmitting data symbols via Orthogonal Frequency Division Multiplexed (OFDM) symbols, the OFDM symbols having a plurality of data bearing sub-carriers and one or more continuous pilot sub-carrier symbols, which are located in the same position for each of the OFDM symbols and scattered pilot sub-carrier symbols, which change position between one OFDM symbol to another, in accordance with a predetermined pattern, the method comprising:

receiving data symbols for communicating via the OFDM symbols;

forming the data symbols into pairs;

generating a first pair of modulation symbols for each of the pairs of data symbols, the first pair of modulation symbols forming first and second modulation symbols of an Alamouti cell;

forming a first version of the OFDM symbols by modulating the sub-carriers allocated for carrying the one or more pilot carriers in accordance with the predetermined pattern, and modulating the sub-carriers allocated for carrying the data with the first and second data symbols of the Alamouti cell;

generating a second pair of modulation symbols for each of the pairs of data symbols, the second pair of modulation symbols forming third and fourth modulation symbols of the Alamouti cell formed for the pair of data symbols in the first version of the OFDM symbols;

forming a second version of the OFDM symbols by modulating the sub-carriers allocated for carrying the one or more pilot carriers in accordance with the predetermined pattern, and modulating the sub-carriers allocated for carrying the data with the third and fourth modulation symbols of the Alamouti cell;

and transmitting the first version of the OFDM symbols via a first antenna, and the second version of the OFDM symbols via a second antenna, wherein the modulating the one or more pilot symbol sub-carriers of the first version of the OFDM symbols and the modulating the one or more pilot symbol sub-carriers of the second version of the OFDM symbols includes modulating the continuous pilot symbol sub-carriers and the scattered pilot symbol sub-carriers in accordance with the predetermined pattern without pre-condition on the location of the pilot sub-carrier symbols with respect to a location of the data bearing sub-carrier symbols, such that for at least one of the pairs of data symbols, the sub-carriers, on which each of the modulation symbols of the first and second pairs of modulation symbols forming the Alamouti cell are modulated, are separated within the first and second versions of the OFDM symbols by at least one other data bearing sub-carrier or one or more scattered or continuous pilot symbol sub-carriers.

15. A method of receiving data from Orthogonal Frequency Divisional Multiplexed (OFDM) symbols which have been transmitted in accordance with the method according to claim 14, the OFDM symbols having a plurality of data bearing sub-carriers and one or more continuous pilot sub-carrier symbols, which are located in the same position for each of the OFDM symbols and scattered pilot sub-carrier symbols, which change position between one OFDM symbol and another, in accordance with a predetermined pattern, the data bearing sub-carriers carrying data symbols which are paired, the method comprising:

receiving a first version of the OFDM symbols from a first antenna, and a second version of the OFDM symbols from a second antenna;

forming an estimate of a first pair of modulation symbols for each of the pairs of data symbols from the first version of the OFDM symbols, using the one or more pilot carriers, the first pair of modulation symbols forming first and second modulation symbols of an Alamouti;

forming an estimate of a second pair of modulation symbols for each of the pairs of data symbols from the second version of the OFDM symbols, using the one or more pilot carriers, the second pair of modulation symbols forming third and fourth modulation symbols of the Alamouti cell corresponding to the pair of data symbols in the first version of the OFDM symbols;

generating an estimate of each of the pairs of the data symbols from the first, second, third and fourth modulation symbols corresponding to each of the Alamouti cells recovered from the first and second versions of the OFDM symbols;

wherein for at least one of the pairs of data symbols carried by the first and second versions of the OFDM symbols, the sub-carriers carrying the modulation symbols of the first and second modulation symbols and the third and the fourth modulation symbols forming the Alamouti cells are separated within the first and second versions of the OFDM symbols respectively by at least one other data bearing sub-carrier or one or more of the pilot carriers, and the generating an estimate of each of the pairs of data symbols includes detecting the pair of data symbols carried by the sub-carriers which are separated by the at least one other data bearing sub-carrier or pilot carrier using a different estimate of a coefficient of the channel frequency response corresponding to the position of each of the sub-carriers within each of the first and second versions of the OFDM symbol.

16. A system for communicating data symbols via Orthogonal Frequency Division Multiplexed (OFDM) symbols, the OFDM symbols including a plurality of data bearing sub-carriers and one or more continuous pilot sub-carrier symbols, which are located in the same position for each of the OFDM symbols and scattered pilot sub-carrier symbols, which change position between one OFDM symbol and another, in accordance with a predetermined pattern, the system comprising:

an apparatus for transmitting and an apparatus for receiving, the apparatus for transmitting including a modulator configured to receive the data symbols for communicating via the OFDM symbols, to form the data symbols into pairs, to generate first pairs of modulation symbols for each of the pairs of data symbols, the first pair of modulation symbols forming first and second modulation symbols of an Alamouti cell, to form a first version of the OFDM symbols by modulating the sub-carriers allocated for carrying the one or more pilot carriers in accordance with the predetermined pattern, and modulating the sub-carriers allocated for carrying the data with the first and second modulation symbols of the Alamouti cells, to generate second pairs of modulation symbols for each of the pairs of data symbols, the second pairs of modulation symbols forming third and fourth modulation symbols of the Alamouti cell formed for the pair of data symbols in the first version of the OFDM symbol, to form a second version of the OFDM symbols by modulating the sub-carriers allocated for carrying the one or more pilot carriers in accordance with the predetermined pattern, and modulating the sub-carriers allocated for carrying the data with the third and fourth modulation symbols of the Alamouti cells, and a transmitter for transmitting the first version of the OFDM symbols via a first antenna, and the second version of the OFDM symbols via a second antenna, wherein the OFDM symbols are formed with the continuous pilot symbol sub-carriers and the scattered pilot symbol sub-carriers in accordance with the predetermined pattern without pre-condition on the location of the pilot sub-carrier symbols with respect to a location of the data bearing sub-carrier symbols, such that for at least one of the pairs of data symbols, the sub-carriers, on which each of the modulation symbols of the first and second modulation symbols and the third and fourth modulation symbols forming the Alamouti cell are modulated, are separated within the first and second versions of the OFDM symbol by at least one other data bearing sub-carrier or one or more of the scattered or continuous pilot symbol sub-carriers, and the apparatus for receiving includes a receiver for receiving a first version of the OFDM symbols transmitted from a first antenna, and a second version of the OFDM symbols transmitted from a second antenna, a demodulator configured to form an estimate of a first pair of modulation symbols for each of the pairs of data symbols from the first version of the OFDM symbols, using the one or more pilot carriers, the first pair of modulation symbols forming first and second modulation symbols of an Alamouti cell, to form an estimate of a second pair of modulation symbols for each of the pairs of data symbols from the second version of the OFDM symbol, using the one or more pilot carriers, the second pair of modulation symbols forming third and fourth modulation symbols of the Alamouti cell corresponding to the pair of data symbols in the first version of the OFDM symbols, a data detector configured to generate an estimate of each of the pairs of the data symbols from the first, second, third and fourth modulation symbols corresponding to each of the Alamouti cells recovered from the first and second versions of the OFDM symbols, wherein for at least one of the pairs of data symbols carried by the first and second versions of the OFDM symbols, the sub-carriers carrying the modulation symbols of the first and second modulation symbols and the third and the forth modulation symbols forming the Alamouti cells are separate within the first and second versions of the OFDM symbol respectively by at least one other data bearing sub-carrier or one or more of the pilot carriers, and the data detector is configured to detect the pair of data symbols carried by the sub-carriers which are separated by the at least one other data bearing sub-carrier or pilot carrier using a different estimate of a coefficient of the channel frequency response corresponding to the position of each of the sub-carriers within each of the first and second versions of the OFDM symbol.

* * * * *